April 26, 1927.  1,626,351
E. B. NOWOSIELSKI
FLEXIBLE ADJUSTABLE COUPLING
Filed Feb. 9, 1923
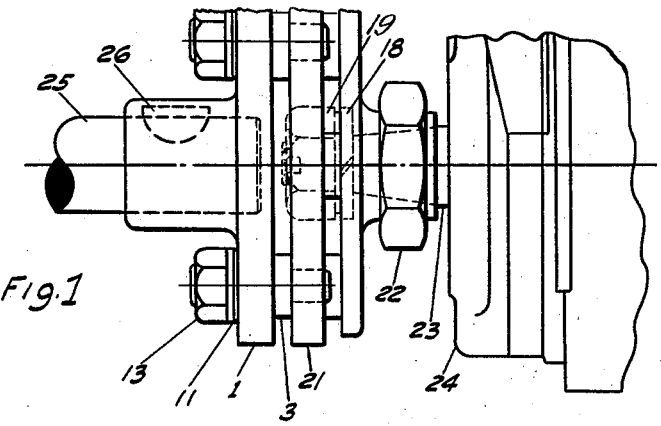
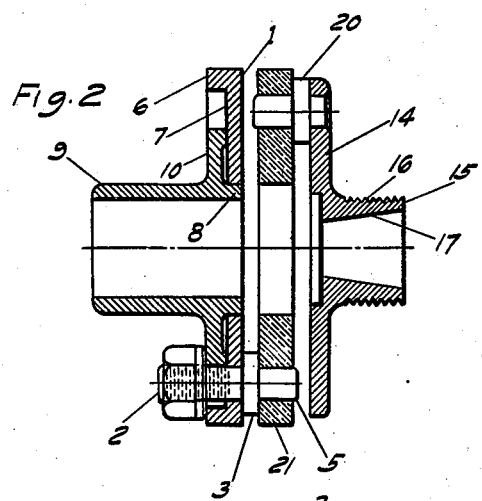 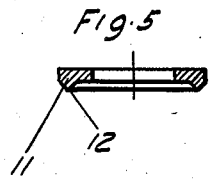
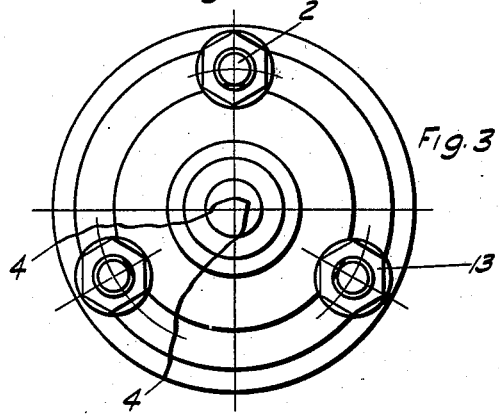
INVENTOR
EDWARD B. NOWOSIELSKI
BY
A. D. T. Libby
ATTORNEY Patented Apr. 26, 1927.

1,626,351

UNITED STATES PATENT OFFICE.

EDWARD B. NOWOSIELSKI, OF BLOOMFIELD, NEW JERSEY, ASSIGNOR TO SPLITDORF ELECTRICAL COMPANY, OF NEWARK, NEW JERSEY.

FLEXIBLE ADJUSTABLE COUPLING.

Application filed February 9, 1923. Serial No. 617,944.

This invention relates to a flexible coupling particularly adapted for use in connecting a driving shaft of an internal combustion engine to a generator or an ignition unit mounted on said engine.

It is the principal object of my invention to provide a coupling which has considerable flexibility between the driving and driven members in order to take up for the misalignment of the driving shaft and the shaft of the unit to be driven, at the same time to provide a construction which is simple and cheap to manufacture.

Another object of my invention, which is an important one, is to provide a coupling in which the driven shaft especially when this is an ignition unit, can be quickly and accurately adjusted through any desired angle with respect to the driving shaft.

A further object of my invention is to provide a coupling which is easily assembled and disassembled from the co-operating shafts.

Other and further objects will be apparent from a study of the annexed drawing taken in connection with the specification, wherein—

Figure 1 is a view of my coupling connected between the driving shaft and the shaft of a driven member, such as a magneto.

Figure 2 is a vertical section through my coupling.

Figure 3 is a left hand end view of the coupling shown in Fig. 1, but with the coupling dismounted from the shafts.

Figure 4 is a fragmentary view on the line 4/4 of Fig. 3, but with the nut and gripping washers removed to show the form of the stud.

Figure 5 is an enlarged view of the cup washer used under the nuts on the studs carried in the driving member.

Referring now to the details wherein like numbers refer to corresponding parts in the various views, 1 is a driving member having three studs 2 preferably spaced 120 degrees apart. The studs 2 have a body portion 3 which shoulders against the inner flat face of the driving member 1. The end of the stud passing through the driving member 1 is reduced in size and has a flat surface 4 which engages a flat surface in the hole of the driving member 1, through which the studs 2 pass. This flat surface prevents the studs from turning around. The inner ends 5 of the studs 2 are reduced in size from the body portion 3 and on these ends 5 is carried a flexible disc member 21 of leather, "thermoid" or other suitable material. The outer side of the driving member 1 terminates in an annular rim 6, the balance of the inner surface 7 being flat and substantially parallel to the inner flat face of the driving member. The driving member 1 has a central hole within which is positioned a projecting part 8 of a member 9 having a flange 10. When the member 9 is assembled to the driving member 1, so that the projection 8 sits within the central opening in the member 1, the flange 10 rests against the outer flat surface of the driving member 1, at some little distance from the axial line. This gives a dowel bearing support for the member 9 which is advantageous in holding the part 9 to the member 1. After the member 9 has been put in place washers 11, which are preferably of hardened steel and formed cup shaped with an edge 12, are placed on the studs 2 and nuts 13 are then screwed on the outer threaded ends of the said studs, causing the edge 12 to grip into the flange 10 and the rim 6 of the driving member 1.

The driven member 14 has an extended hub 15, which is threaded at 16, and a tapered hole 17 adapted to fit on the tapered shaft of a magneto generator, being held thereon by the usual lock washer 18 and nut 19 as shown in Figure 1. In many cases a key is also used, but for the sake of clearness, this is not shown. The driven member 14 has three studs 20 with their inner ends, similar to the ends 5 of the studs 2, which ends engage the flexible disc 21 intermediate the stud ends 5. On the threads 16 is carried a nut 22 which is used for the purpose of forcing the driven half of the coupling member off from its shaft 23 by backing the nut off until it hits the edge 24 of the driven device, which being stationary will not yield and consequently the coupling will be backed off at the tapered end of the shaft.

The member 9 is fastened to the driving shaft 25 either by a pin or a key 26 or both as preferred, a key only being indicated.

In adjusting the shaft 23 with respect to shaft 25 the nuts 13 are loosened and then the coupling together with the shaft 23 can be turned the slightest fraction of a degree or any degree up to a complete revolution if necessary, after which the nuts 13 are retightened causing the cup washers to grip the rim 6 and flange 10 as heretofore described, thereby locking the member 9 to the driving member 1.

In the couplings with which I am familiar while certain adjustments may be made this adjustment is usually limited in degree or the steps are too large and as will be seen I have provided a coupling that gives the closest possible degree of adjustment, yet the adjustment is of the very widest kind, namely, a complete revolution.

While I have shown one form of my invention, it will be understood that the same is susceptible to certain changes in the details without departing from the spirit of my invention and the scope of the appended claims.

Having thus described my invention, what I claim is:

1. In a device of the class described, in combination with driving and driven members longitudinally spaced apart, with the driven member on a shaft, each member having parts projecting toward the other and a disc of flexible material carried on said projecting parts, a flanged member adapted to be drivingly attached to an operating shaft and having a part extending through the driving member whereby the flange is seated directly against a wall of the driving member, said driving member having an annular rim of substantially the same diameter as said disc extending outwardly substantially flush with the outer surface of said flange, studs extending outwardly from the driving member between the rim and said flange and a plurality of means carried on said studs independently and separably operable for gripping directly the rim and flange for the purpose described.

2. In a device of the class described, a driving member having a flat surface on one side with a central opening therein and a projecting rim on the other side, studs secured to said member closely adjacent the rim and projecting from both sides, a flanged member adapted to be drivingly connected to an operating shaft and having a part projecting through said central opening in the driving member, gripping members carried on said studs with means for causing them to grip the flange and rim, a flexible member engaging the said studs on the flat side of the driving member and a driven member carried on a shaft and having studs to engage said flexible member as described.

3. In a device of the class described, a driving member having a flat surface on one side with a central opening therein and a projecting rim on the other side, studs secured to said member closely adjacent the rim and projecting from both sides, a flanged member adapted to be drivingly connected to an operating shaft and having a part projecting through said central opening in the driving member, cupped washers carried on said studs and nuts on the studs for forcing the said washers to grip the flange and rim, a flexible member engaging the said studs on the flat side of the driving member, and a driven member carried on a shaft and having studs to engage said flexible member as described.

4. In a device of the class described, a driving member having a flat surface on one side with a central opening therein and a projecting rim on the other side, studs having shoulders lying against said flat side with two reduced ends, one reduced end having a flat side passing through a cooperating opening in the driving member closely adjacent said rim, a flanged member adapted to be drivingly connected to an operating shaft and having a part projecting through said central opening in the driving member whereby the flange engages the wall thereof, cupped washers carried on said studs and nuts on the studs for forcing the said washers to grip the flange and rim, a flexible member engaging the other reduced end of said studs and a driven member carried on a shaft and having studs to engage said flexible member intermediate the studs on the driving member.

In testimony whereof, I affix my signature.

EDWARD B. NOWOSIELSKI.